Feb. 16, 1943. W. F. LANGE 2,311,448
STEERING WHEEL
Filed Dec. 9, 1940

Inventor
William F. Lange
By Blackmore, Spencer & Flint
Attorneys

Patented Feb. 16, 1943

2,311,448

UNITED STATES PATENT OFFICE 2,311,448

STEERING WHEEL

William F. Lange, Detroit, Mich., assignor to General Motors Corporation, Detroit, Mich., a corporation of Delaware Application December 9, 1940, Serial No. 369,176

2 Claims. (Cl. 74—552)

This invention relates to steering wheels used on automotive vehicles.

The rims of steering wheels in use today are usually made with a metal center surrounded by a hard rubber exterior, the exterior being of Bakelite or a suitable opaque thermoplastic substance or a resin. It is also the practice to place the instruments on the instrument panel immediately behind the steering wheel so that at times the rim or the spokes of the wheel, or both, will be in the line of sight to the instruments and interfere with a clear view thereof by the driver.

The thought occurred to me that it would be desirable to have a steering wheel in which the upper half, or the section of the rim between the driver and the instruments on the panel, be made thinner than the conventional steering wheel, whereas the lower half of the rim could be of the usual thickness. This decrease in the thickness of the top part of the rim of the steering wheel would diminish the obstruction and lead to an easier view of the instruments.

With a view further to make better the view of the instruments, it is proposed to make a steering wheel of a transparent substance such as a thermoplastic resin (Tenite or Lucite), and with such a transparent wheel, together with a reduced cross-sectional area of the rim at the upper side of the wheel, the obstruction to a view of the instruments is reduced substantially to a minimum.

Another feature of the invention is that at the place of junction of the thinner or smaller part of the rim with the larger part, two shoulders are formed which form grips to give a better hold to the hand in turning the wheel.

Figure 1:
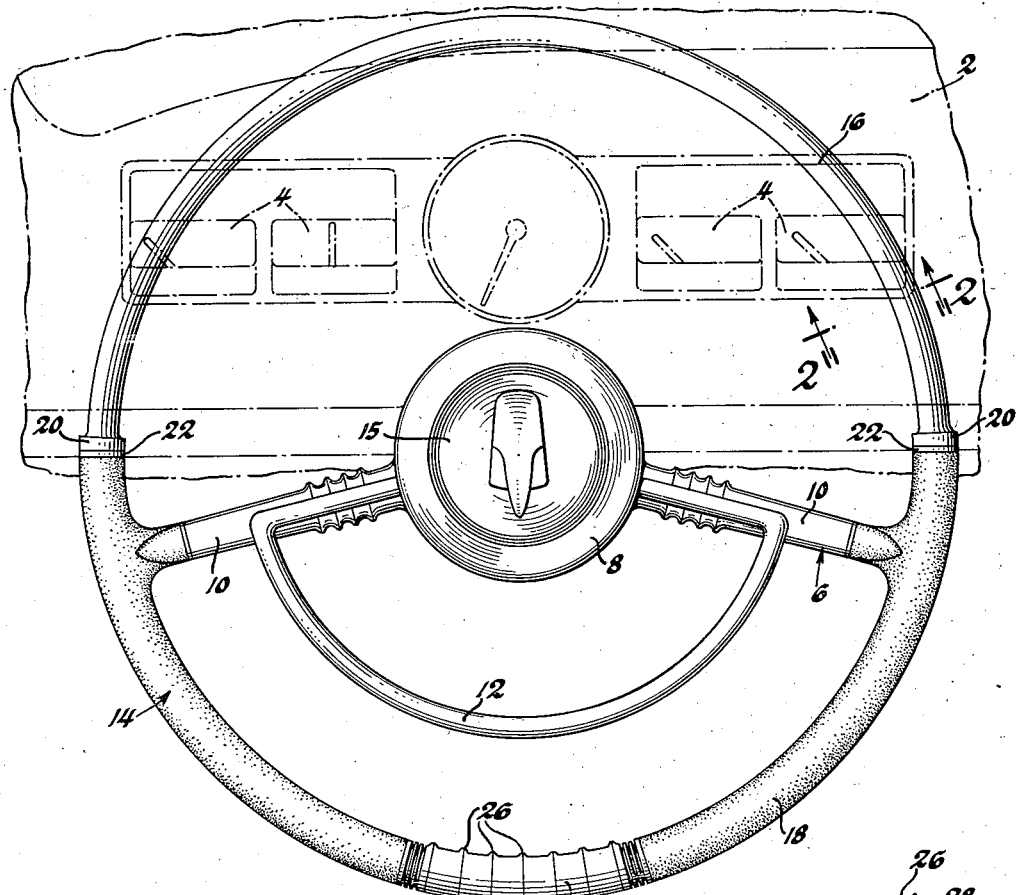
Figure 1 is a plan view of a steering wheel made in accordance with the invention and showing a transparent wheel made of a thermoplastic material.

Referring to the drawing, the instrument panel of the usual automobile is indicated in dotted outline at 2, and the various instruments on the panel are indicated thereon by the reference numeral 4.

Figure 2:
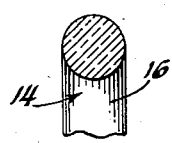
Figure 2 is an enlarged section on the line 2—2 of Figure 1, showing the smaller cross-sectional area.

The steering wheel of the invention is indicated as a whole at 6 and is positioned immediately in front of the instruments and between the driver's seat and the instruments. In the species of Figures 1 and 2, the steering wheel is made of a transparent resin such as Tenite or Lucite. This wheel comprises the hub 8, the spokes 10, and the rim 14, and has a horn sounder ring 12 applied thereto. If desired, a horn sounder button 15 may be applied to the hub 8. The upper half 16 of the rim has a cross-sectional area which is considerably less than the cross-sectional area of lower half 18. The lower half 18 has a cross-sectional area, or a diameter, which is usual with steering wheels, whereas the cross-sectional area, or the diameter, of the part 16 of the rim is considerably less than usual. This reduction in cross-sectional area of part 16 reduces the obstruction between the observer and the instruments 4 and enables the instruments easier to be seen. By making the steering wheel 6 of Lucite, the visibility is further increased for the reason that the operator is able to see through the Lucite and view the instruments 4.

At 20, or where the rim half 16 joins onto the rim half 18, shoulders are formed which act as grips to aid the hands in turning the wheel when steering the vehicle.

The Lucite wheel 6 may have the narrow decorative chromium strips 22 and a wider strip 24 immediately adjacent the driver, and at the center part of the rim half 18. The chromium piece 24 may be provided with suitable raised parts 26 to act as grips to aid the hand in turning the wheel.

Figure 3:
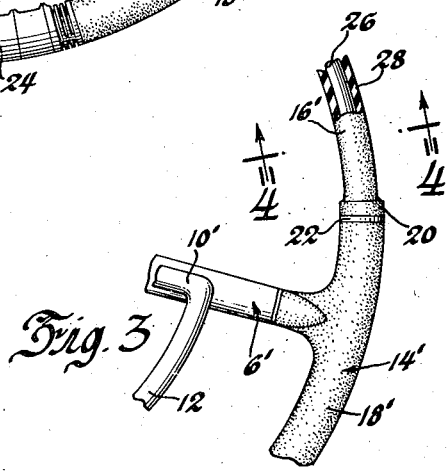
Figure 3 is a view similar to Figure 1, but with parts broken away showing the conventional type of wheel having a reduced diameter rim at the upper part.
Figure 4:
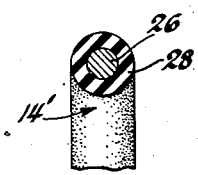
Figure 4 is an enlarged section on the line 4—4 of Figure 3.

In Figure 3 the steering wheel 6' is not made of transparent material, but is constructed in the usual way and has a central metal core or reinforcing member 26 surrounded by a sheath 28 of opaque material such as Bakelite or hard rubber, or any suitable thermoplastic substance. The upper rim half 16' is of a less width than the lower half 18' and thereby decreases the obstruction to a view of the instruments 4 on the instrument panel. The spokes 10' are made in the usual way.

The property of Lucite of transmitting light in a curved path is well known. In case any light source should cause its rays to fall upon any part of the Lucite of the wheel, the entire wheel will be illuminated.

I claim:

1. A steering wheel adapted for application to an automotive vehicle which has an instrument panel and comprising a rigid rim extending continuously 360 degrees in circumference, said rim having two approximately semicircular parts of different cross-sectional area, a hub, and spokes extending from said hub to that part of said rim having the larger cross-sectional area, the cross-sectional area of one of said parts being substantially smaller than that of the other part and the change in cross-sectional area at the places of junction between the two parts being abrupt, whereby shoulders are provided to enable the operator's hand better to grip the rim and whereby obstruction between the operator's eyes and the instrument panel may be minimized.

2. A steering wheel adapted for application to an automotive vehicle which has an instrument panel and comprising a rigid rim extending continuously in a complete circle, said rim having two approximately semi-circular parts of different cross-sectional area, a hub, and spokes extending from said hub to only that part of said rim having the larger cross-sectional area, the other part of the rim having the smaller cross-sectional area being formed of a tough transparent material, the change in cross-sectional area between the said two parts being substantial and abrupt, whereby shoulders are provided to enable the operator's hand better to grip the rim and whereby substantially all obstruction to the operator's view of the instrument panel may be eliminated.

WILLIAM F. LANGE.